Nov. 14, 1933.   R. D. EVANS   1,935,290
REGULATOR SYSTEM
Filed July 3, 1931   4 Sheets-Sheet 1
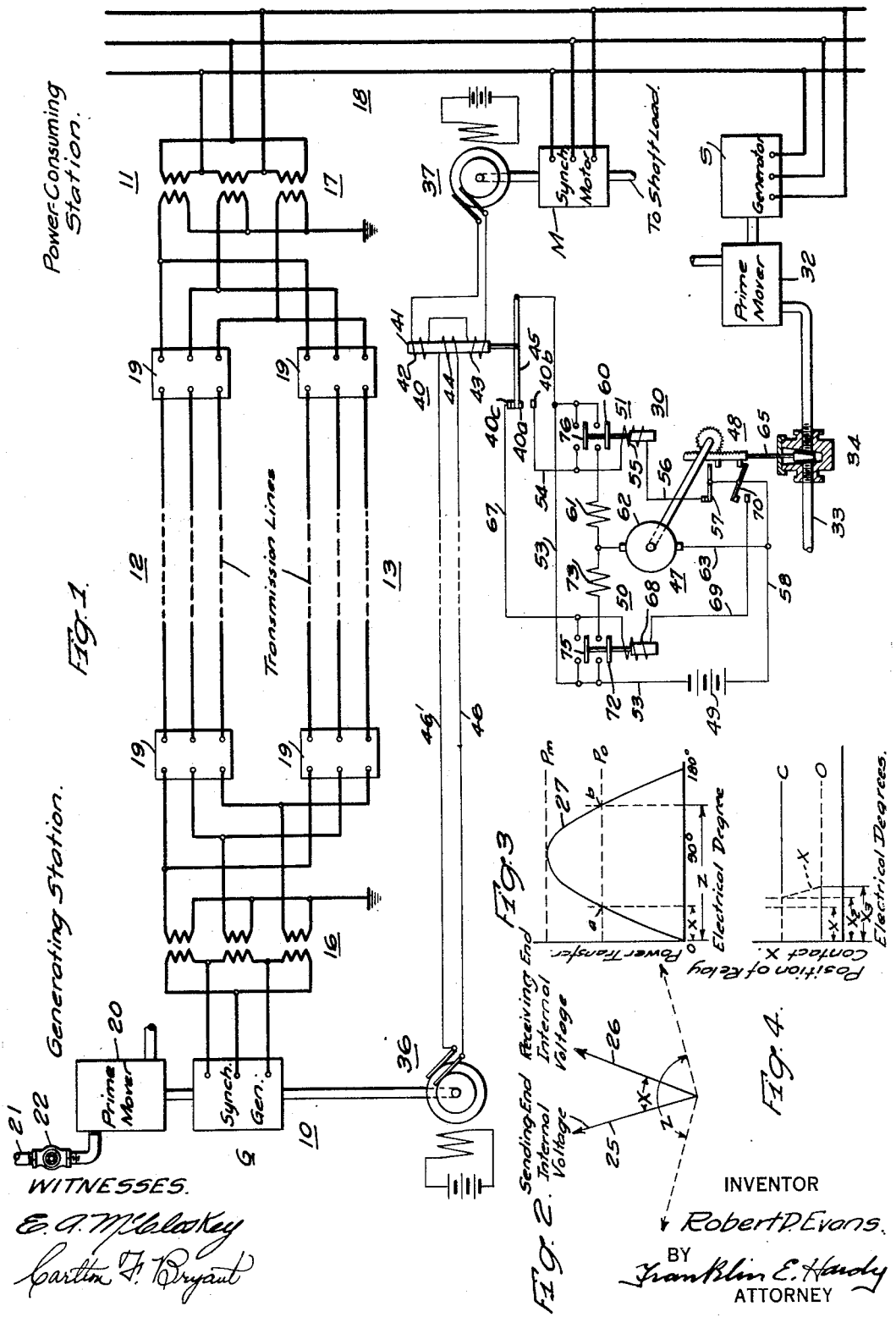
INVENTOR
Robert D. Evans.
BY Franklin E. Hardy
ATTORNEY
WITNESSES.
E. A. McCloskey
Carlton F. Bryant

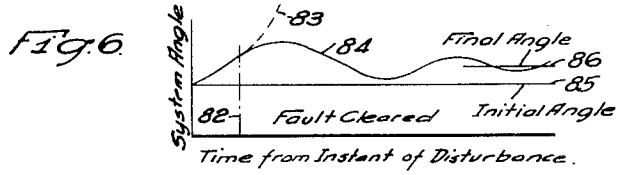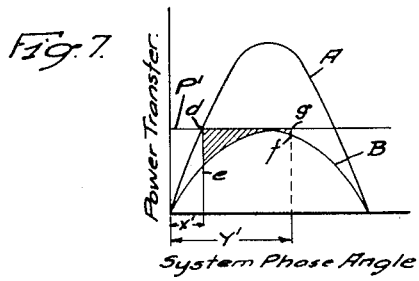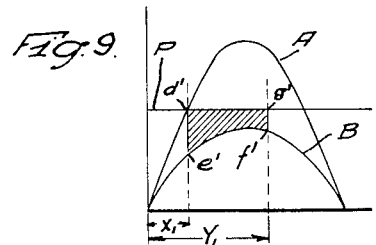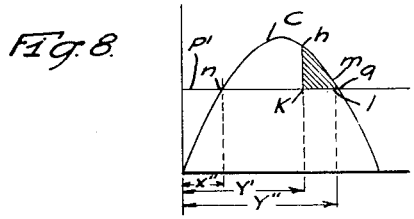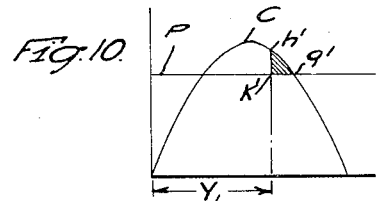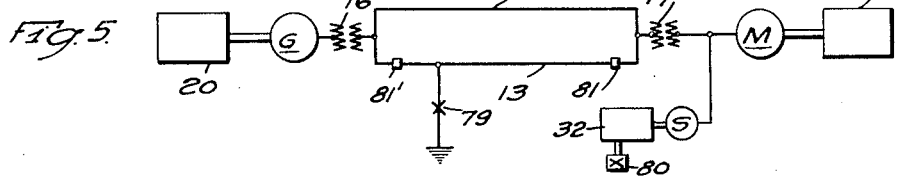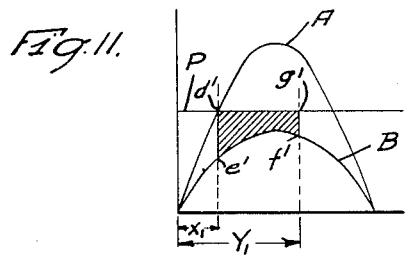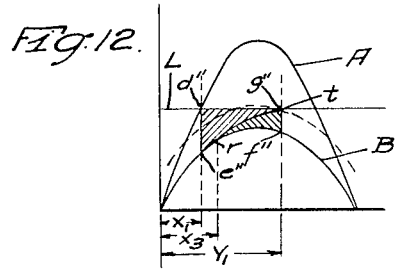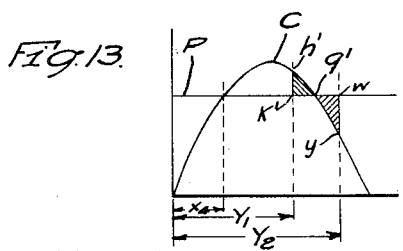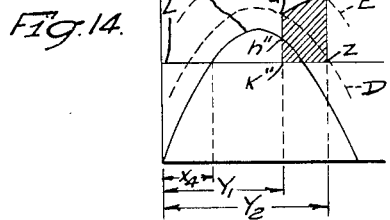

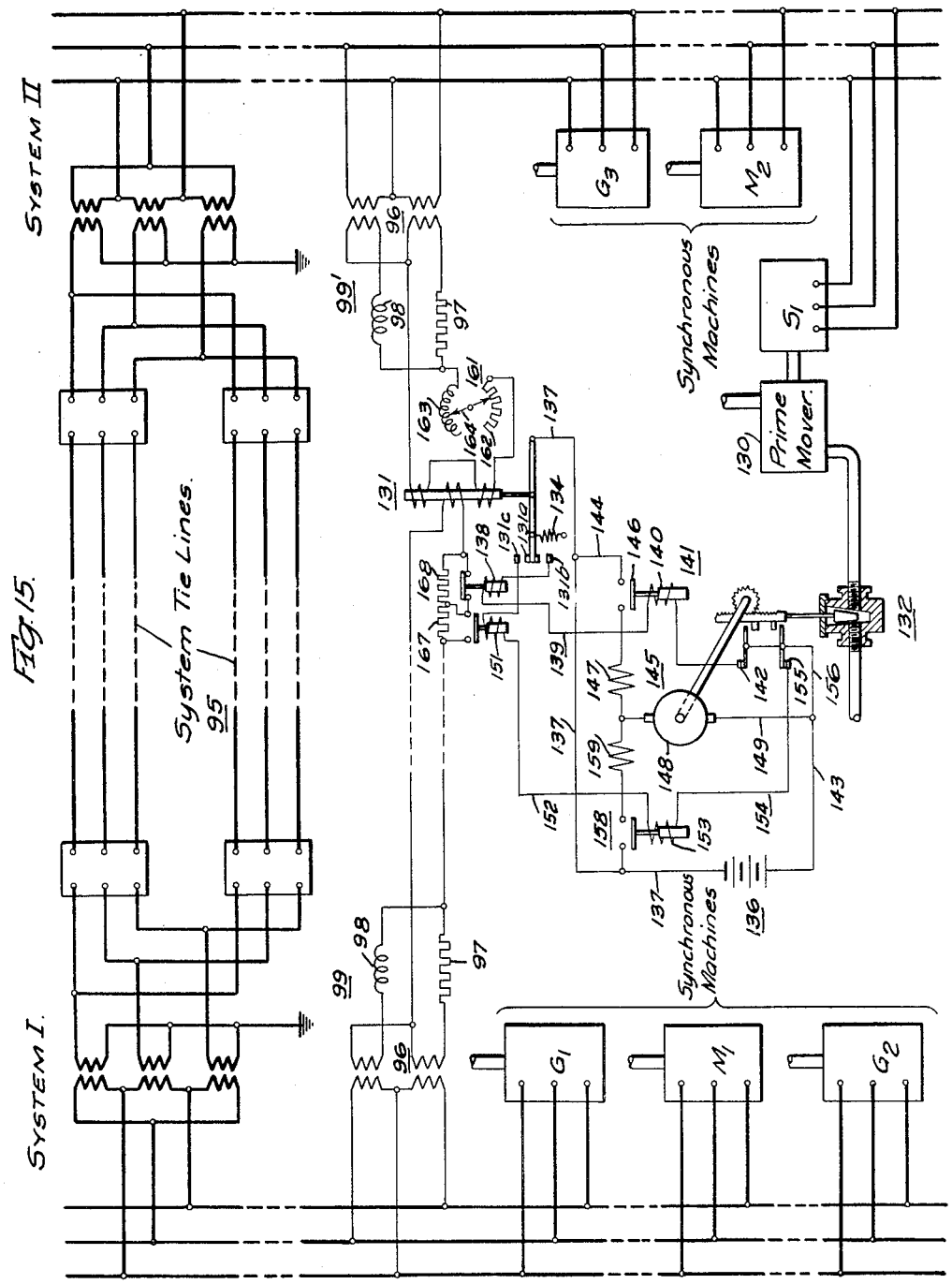

Nov. 14, 1933.    R. D. EVANS    1,935,290
REGULATOR SYSTEM
Filed July 3, 1931    4 Sheets-Sheet 4
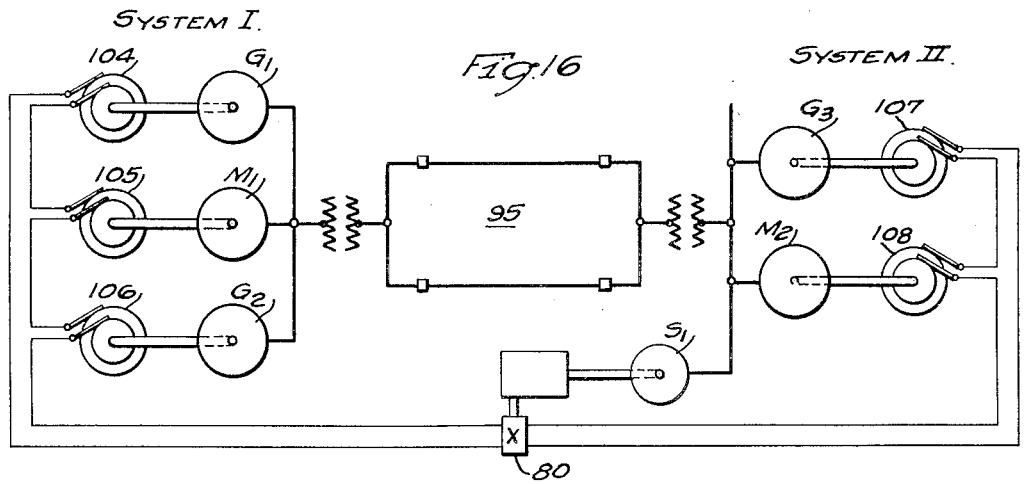
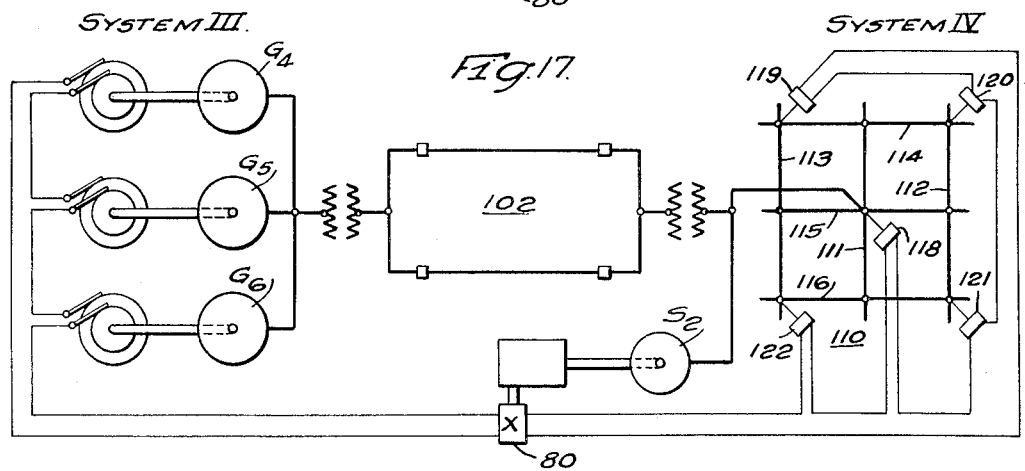
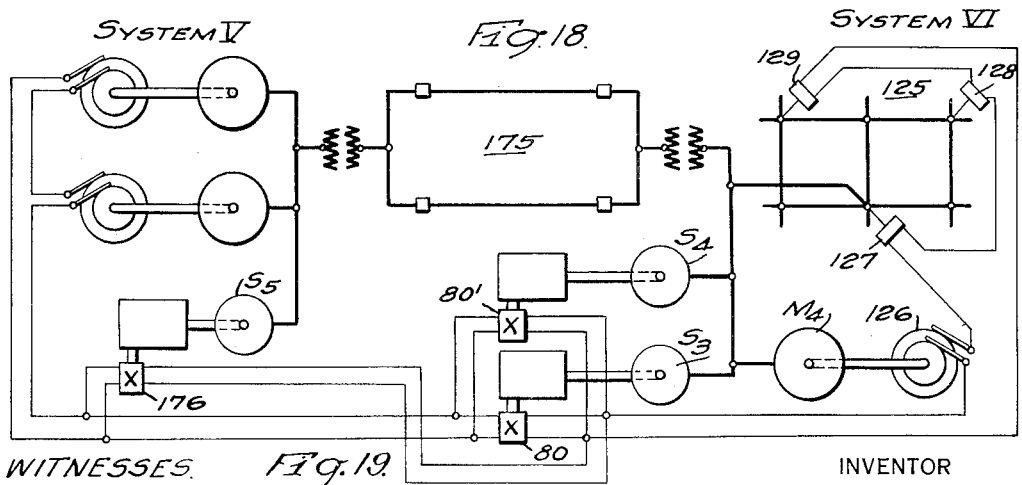
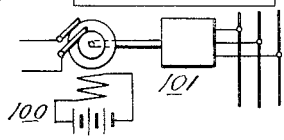
WITNESSES
E. A. McCloskey.
Carlton F. Bryant
INVENTOR
Robert D. Evans.
BY
Franklin E. Hardy
ATTORNEY Patented Nov. 14, 1933

1,935,290

UNITED STATES PATENT OFFICE 1,935,290

REGULATOR SYSTEM

Robert D. Evans, Swissvale, Pa., assignor to Westinghouse Electric & Manufacturing Company, a corporation of Pennsylvania Application July 3, 1931. Serial No. 548,591

36 Claims. (Cl. 290—4)

My invention relates to electrical-power systems and has particular relation to means for increasing the stability and power limits of alternating-current transmission lines and system-tie lines or synchronous machine interconnecting circuits.

In present-day long-distance power-transmission systems, the majority of which involve alternating-current machines of the synchronous type connected through circuits of considerable reactance, stability problems are paramount in determining the load which may be carried by the system. The necessity of so maintaining stability that, at no time, will the system angle be caused to exceed the critical or "pull-out" value, beyond which the interconnected machines cannot operate in synchronism, is universally recognized, since a system which is so deficient in this respect as to permit synchronous machines to fall out of step obviously becomes inoperative at such a time.

In an alternating-current electrical system, power flows principally by reason of a phase-difference between the rotors of the synchronous machines at the sending and receiving ends, or, what amounts substantially to the same thing, a phase difference in the internal or generated electromotive forces of the machines at the opposite ends of the line. At any given voltage, power and reactive kva., it is the reactance of the system which principally determines the amount of said phase difference.

The reactance of the system is, therefore, the elastic element of the electro-mechanical oscillating system, because the reactance makes a quick change in phase relation, and, hence, an oscillation is necessary before there can be a sudden change in the power generated and transmitted. The inertia element of the electro-mechanical oscillating system is the mechanical inertia of the rotors of the machines, or the flywheel effects of machines.

When the power demand on a generator increases or decreases substantially by reason of load changes, switching, short-circuits or other transitory causes, there exists a momentary unbalance between the generator power input and the generator power output.

This unbalanced condition is created because electrical changes in the transmission system occur much faster than mechanical changes in machines connected thereto, and because changed load conditions require that the phase angle between the generator and the motor internal voltages vary in order to produce a balanced power condition.

One electrical characteristic of a simple power-transmission system, consisting of a generator, line, and load, is that the power transfer between interconnected synchronous machines is a sine function of the phase displacement between the sending-end and receiving-end machine internal voltages. Maximum transfer of power in such a system is attainable when this displacement is in the neighborhood of ninety electrical degrees, which condition is termed the "static stability" or maximum power-capacity point of the system. The more complicated and involved types of alternating-current systems likewise possess definite characteristics, as regards power transfer and voltage phase displacement. Depending upon the elements of, and their interconnection in, the particular system, this power-angle relation may be in accordance with a curve of modified sine form or the combination of several of such fundamental curves. For every system there will exist a static stability or maximum power-transfer point which corresponds to some given value of angular displacement.

In the case of a power system operating close to the static-stability limit, or with the transmission-line sending-end and receiving-end machines approaching the particular value of phase shift in the internal voltages, which corresponds to that limit there is very little tendency for the machines to drift apart under steady load conditions. Under transient conditions, however, such as result from switching operations, faults, or other transitory conditions of the transmission circuit, oscillations are produced which may carry the system beyond the limiting stable angle.

In order that a power system may possess "transient stability", or the ability to regain a state of equilibrium after a disturbance has taken place, it has been necessary, in the past, that normal loads on the system lie well below the static limit in order to ensure that synchronism be maintained under operating conditions of the frequently occurring transient variety. It will be apparent, consequently, that, because of this necessity of limiting the system-angle overswing, a full utilization of the entire power-transmitting capacity of any given transmission circuit has not been possible.

I have discovered that, if the power input to one or more of the system-generator prime movers be suitably modified during the time that these transient conditions are effective, it is possible to substantially minimize the tendency of this overswing. By such an expedient, therefore, the maintenance of stability limits of power systems considerably in excess of those required for a steady state under the worst condition is rendered unnecessary, and the power-transmitting capacity of any given system may be materially increased thereby. My invention is directed to a scheme for attaining this and other advantageous results.

Generally stated, it is an object of my invention to increase the stability and power limits of electrical circuits connecting alternating-current systems involving synchronous machines.

One object of my invention is to reduce the cost of electrical transmission and system tie-line circuits.

Another object of my invention is to provide means for improving the stability of power-transmission systems during such conditions as tend to cause the generator and motor ends of the transmission circuit to fall out of synchronism.

It is a further object of my invention to provide, in an electrical power-transmission system of the type described, means for increasing the stability and the power-limits of the system beyond those determined by the inherent electrical and mechanical characteristics of the machines and of the circuits connecting them.

It is a further object of my invention to provide means, including automatic devices, for increasing the stability and the power limits of an electrical system comprising synchronous machines connected through transmission circuits of such reactance that the power-carrying capacity, with stability, is limited by reactance.

Another object of my invention is to increase the transient stability limit of power-transmission systems by using phase-angle controlled automatic means which function within a given time after a transient disturbance to increase the input of a prime mover for a generator at the receiving end of the system.

A still further object of my invention is to provide automatic means for increasing the transient stability limit of a transmission system, which means may be controlled by the system phase angle to modify, within a given time after a transient disturbance, the prime-mover input of a generator at the sending-end of the system in accordance with the effect of the fault condition.

An additional object of my invention is to provide means for increasing the artificial stability of the transmission system during steady-state operation.

More specifically stated, it is an object of my invention to increase the amount of power that may be transmitted through a given transmission circuit by providing means for maintaining the phase angle of the circuit within prescribed limits, to thereby permit operation close to the system static-power-transfer limit without instability resulting during transient conditions or disturbances.

In United States Patent No. 1,692,495, issued November 20, 1928, to R. D. Evans, et al., and assigned to the Westinghouse Electric and Manufacturing Company, is described an automatic scheme for improving system stability through automatic control of the excitation of the generators. This scheme, known as "quick response excitation", includes means for changing the excitation in a period of time which is so short that the system does not swing to a critical point beyond which recovery is doubtful.

As is pointed out in the patent above referred to, the theory of artificial stability essentially depends upon the use of transient reactance of machines instead of synchronous reactance for determining the stability limits. If no special stabilizing means are present, there is a tendency for the machines, when slightly exceeding the maximum stable angle between internal voltages, to increase the demagnetizing currents and thus reduce the air-gap flux which cumulatively tends to increase the angle between machines leading to pull-out. As is further pointed out in that patent, with quick-acting voltage regulators available, any tendency for the machine to increase its angle tends to drop the internal voltage and bring the regulators into play for increasing the excitation. The effect of this increased excitation is to increase the internal voltage and to reduce the overall angle between machines.

Thus, without regulators, the maximum angle is determined by synchronous reactance whereas, with quick-acting voltage regulators, the maximum angle is determined by fictitious reactance intermediate synchronous reactance and transient reactance. Improvement in system power limits is thus effected with the automatic regulators by causing the system to operate within a range of artificial stability, the significance of which term is completely explained in the specification of the patent referred to.

In the quick-response excitation scheme discussed, increases in the angle between the internal voltages of the system synchronous machines tends to reduce the internal voltages of the machines and causes the voltage regulators to act to increase the excitation and thus reduce the angle between internal voltages. In a similar manner, the increase in angle may be used directly to modify the prime-mover input of a system generator in a manner which tends to reduce this angle and to thereby maintain stability. Thus, it will be evident that, by the utilization of system phase-angle-responsive generator-prime-mover-input control, an alternative means is provided for avoiding demagnetization of the machine and for facilitating operation in the zone of artificial stability. Such prime-mover input control means are disclosed in this case.

With commercial machines operating at loads slightly in excess of the stability limit with fixed excitation, the process of pulling out of step may be quite slow. In practice, it is found that the period of time available for readjusting excitation or other equivalent control, under the above stated conditions, is long enough for an operator to recognize the condition and to manually adjust rheostats to change the excitation in the required direction. Hence, it will be seen that there is ample time for an automatic stability-improvement regulator to act, particularly in the most frequently encountered cases in which the system angle corresponding to transient reactance is somewhat below ninety electrical degrees.

In the case of quick-acting automatic voltage regulators applied to system synchronous machines for maintaining the same terminal voltages, laboratory tests have conclusively demonstrated that the slowly increased or steady-load limit of a given transmission circuit may be increased from 100%, with fixed excitation, to 125% or 150%, with automatic voltage control. Similar tests show that, if the reactance of the machine interconnecting circuit is made zero, the pull-out power limit under steady-state conditions may be increased from 100% to 300% or 400%. The percentage values stated are based upon a 100% power limit for the system, determined, for particular terminal voltages of the interconnected generator and motor, by the synchronous reactances of the machines and any additional reactance of the interconnecting circuits.

It will be apparent, therefore, that an automatic regulating scheme which permits a transmission system to operate in a range of artificial stability, permits the power limits of that system to be substantially increased. The phase-angle-responsive, prime-mover control means disclosed in this case will be seen to comprise an effective device for obtaining such an effect.

In practicing my invention, I contemplate the provision of special input-control means for the prime movers of certain generators in the system, which means function to modify the inputs of these prime movers in accordance with changes in the phase angle between representative voltages in the sending-end and receiving-end of the circuit which is to be benefited. The source of energy utilized by the phase-angle-controlled generator prime movers is preferably of the type which permits of rapid control, for example, steam, since the effectiveness, as regards stability improvement, will be seen to largely depend upon the rapidity of response of the regulating means.

These generators may be located at the sending-end or the receiving end or at both ends of the system, as the particular system arrangement and conditions may make preferable. In any case, the method of control will be such that the tendency for the system-phase angle to increase beyond safe stable limits will be counteracted by the change in prime-mover input which the abnormal phase-angle condition is caused to initiate.

Such specially controlled steam-driven generators, for example, if located at the receiving-end of the system, as in accordance with one specific embodiment of my invention, may normally be operated at no load but with steam available in the power-plant boilers so that power can be delivered by them in response to an opening of the prime-mover governors. These governors, instead of being operated in the ordinary manner to maintain substantially constant speed, may be disposed to open with great rapidity whenever the system angle becomes so large as to make desirable a supply of power from these generators to assist in the maintenance of synchronism.

An important advantage of such a system is the reduced cost of transmission lines which its application makes possible by permitting the power system to be operated closer to the maximum power-transfer limit than would be permissible without special means for periodically supplying power to the receiving-end in order to maintain synchronism.

It will be evident, furthermore, that a scheme of operation, such as proposed, will fit in with the present-day practice of large power systems which involve both hydro and steam plants, wherein economical considerations require a division of the total power generation. It is not uncommon that the steam plants, in such systems, be located relatively close to important load-consumption centers, while the hydro plants may be situated at distant points of natural water supply and be interconnected with the steam plants and load-distribution circuits by means of transmission lines.

In such an organization of power-supply equipment, it is of considerable economic importance that maximum use be made of the hydro-electric and transmission portion of the system during the period of plentiful water, as in the spring season. During such periods the hydro plants may be capable of supplying the major portion of the total system loads so that the capacity of the steam plants at the receiving-end of the transmission lines, will, at such times, not be required. Instead of keeping these steam plants idle or inoperative during these periods, or connected to the system but operating at no load, they may be utilized, to permit, according to the teachings of my invention, the hydro-plant transmission lines to be operated nearer the point of maximum-power transfer, by being kept ready to supply power, with the method of controlling the input such as is of value in maintaining synchronism.

Still another situation in the general power-system field in which my invention may be applied with particular advantage is that in which the necessity of continuously supplying important loads, in the event of trouble on the transmission lines, must be seriously considered. A careful analysis of many situations will indicate that the importance of certain essential loads will warrant the provision of an auxiliary generating plant at the receiving end to afford such precautional measures. Such a plant may be readily arranged, in accordance with my invention, to increase the stability and normal power limits of the system, in such manner that these further benefits are obtainable at a relatively small cost.

As has been pointed out, the system of my invention is not limited in its application to the control of special or auxiliary generators at either end of the line but may be applied to any machine at the sending or the receiving end. It is customary to operate steam-driven generators located at the receiving-end of the system at partial loads so that, in the event of the loss of a unit, the remaining units will be capable of carrying the normal load. Instead of using sluggish methods of control, which have been utilized in the past in such a system set up, I propose to use rapid means which will make changes in prime-mover input within such a short time that gain in stability can be insured.

In a copending application, Serial No. 270,187, filed April 16, 1928, by S. B. Griscom and C. F. Wagner and assigned to the same assignee as this application, there is described a system for reducing the prime-mover input of generators at the sending end of a transmission line upon the occurrence of certain transient conditions. My present invention goes further than this and discloses methods for improving stability through the increase in prime-mover input, under conditions which make such a change effective. Thus, I propose to increase stability limits by either increasing or decreasing prime-mover inputs in accordance with the effect of the particular transient conditions in progress.

In the above-mentioned, as well as additional modifications of this invention, these stability-improvement and power-limit-increase advantages are obtained by modifying the means for controlling the prime-mover input of certain of the generating units, as before mentioned, in such a way that not only do these units rapidly change their load outputs after a transmission-line transient, but the action takes place so quickly that loss of synchronism is prevented thereby.

My invention will best be understood from a description of specific embodiments thereof, when taken in conjunction with the accompanying drawings, in which Figure 1 is a diagrammatic view of one embodiment of my invention applied to an alternating-current power-transmission system comprising a single generator at the sending end and a single synchronous motor at the receiving end;

Fig. 2 is a vector diagram illustrating the phase displacement between the internal voltages in the synchronous machines at the sending and the receiving ends of the system of Fig. 1;

Fig. 3 is a power-angle diagram which applies to the system of Fig. 1;

Fig. 4 is a diagram of curves showing the responsiveness of the phase-angle relay utilized in the system of Fig. 1;

Fig. 5 is a simplified single-line diagram of the transmission system of Fig. 1;

Fig. 6 is a diagram of curves illustrating the change in phase angle with time from the instant of a disturbance on the system of Fig. 5;

Figs. 7 to 10, inclusive, are power-angle diagrams illustrating the stability and power-limit characteristics, for given conditions, of the system of Fig. 5 when my invention is not employed therewith;

Figs. 11 to 14, inclusive, are power-angle diagrams illustrating the improvement in stability and power limit which my invention effects when combined with the system of Fig. 5;

Fig. 15 is a diagrammatic representation of a modification of my invention applied to an alternating-current transmission system comprising a plurality of synchronous machines at both the sending end and the receiving end thereof;

Fig. 16 is a simplified single-line diagram of the power-system of Fig. 15 illustrating means for obtaining a composite-phase-position voltage for a plurality of parallel-connected synchronous machines;

Figs. 17 and 18 are single-line diagrams of power systems of other types showing means for obtaining a composite-phase-position voltage for a distribution-circuit network, and for a network in combination with synchronous machines at the receiving end, and Fig. 19 is a diagrammatic representation of a low-inertia motor-generator set which may be substituted for either of the positive-phase-sequence networks in the system shown in Fig. 15.

Referring to the drawings, and particularly to Fig. 1 thereof, the power system there illustrated comprises a generating station 10, which supplies power to a load-consuming station 11 through two transmission lines 12 and 13. As illustrated, the generating station comprises a single three-phase generator G, of the well-known synchronous type, connected to suitable step-up transformers 16 which, in turn, energize the two parallel transmission lines 12 and 13. Lines 12 and 13 are connected to a group of receiving-station step-down transformers 17, the secondary windings of which are connected to a load-consuming station bus 18.

Generator G may be driven in any suitable manner, as from the prime mover illustrated at 20, which may be supplied with motive fluid through pipe line 21 in which is placed the usual control or governing means 22.

Connected with station bus 18 is a synchronous motor M which supplies a shaft load (not shown) and which, we may assume, consumes the entire output of generator G. At the ends of each of the transmission lines, I have illustrated the usual circuit breakers 19 which may be disposed to be opened, in response to the occurrence of a fault on the line, in a well-known manner and by means not shown in Fig. 1.

It will be recognized that power transfer from generator G to motor M, results, as has been mentioned, from a phase displacement between the respective internal voltages of these two machines. In Fig. 2, I have illustrated these voltages by vectors 25 and 26, respectively, displaced at an angle X, which is of a magnitude such as might be encountered during the normal operation of the power system of Fig. 1.

Changes in this angle of displacement cause changes in the quantity of power transferred in accordance with curve 27 of Fig. 3. It will be recognized that curve 27 is a sine curve, the power transfer values being directly proportional, as before mentioned, to the sine of the displacement angle between the internal voltages in the sending and receiving end synchronous machines.

Examination of Fig. 3 will show that the maximum power transfer is effected when this displacement angle is substantially ninety electrical degrees, which gives the high or previously mentioned static-stability value on the curve, designated in Fig. 3 by $Pm$.

From a practical standpoint, however, as has been explained, it is impossible to take complete advantage of this maximum or static-power limit in any given system for the reason that system disturbances, such as switching, load fluctuations, occurrence of faults, and the like, tend to displace the synchronous-machine rotors from the steady-state displacement angle to the extent that pull-out is likely to occur unless the original or steady-state angle is somewhat below the static-power-limit value. Consequently, in practice, it is necessary to operate the system at some lower displacement-angle value, such as is designated by X of Fig. 3.

For steady-state conditions, when the system is operating at angle X, the power transferred is given by line Po of Fig. 3. Thus, Po may designate the power output of generator G in the system of Fig. 1 for a practical operating condition, and, neglecting losses in the synchronous machines and the transmission lines, which will be seen to be permissible for the purposes of this discussion, Po may likewise indicate the power input to generator G, as well as the input to synchronous motor M and the mechanical-power output or shaft load of the motor.

The intersection of the line Po and the curve 27 at point $a$ determines the machine internal-voltage displacement angle, previously assumed to have the value given by X in Fig. 3, necessary to effect this power transfer. Further consideration of the diagram of Fig. 3 will reveal that $a$ is a point of stable operation for the system, because small displacements from that point will set up forces tending to restore the system to the original condition. Conversely, the larger-angle intersecting point $b$, of line Po and curve 27, is an unstable point of operation because small displacements from that point will set up forces tending to move the system away from that particular given operating condition.

Thus, if the system is operated with the power input Po, or other steady-state stable value, and a disturbance takes place causing the system angle to increase beyond the value given by Z in Fig. 3, it will be unable to recover itself even though the disturbing force has been removed.

It will be evident from the diagram that, under the most favorable operating conditions, the load may be increased to the value indicated by P*m*, which represents the static limit for the circuit assumed and with the generator and motor voltages maintained. While there is a definite static limit dependent on circuit characteristics and on the voltage conditions, there is no well defined limit for transient stability or ability of the system to retain synchronism during disturbances.

In fact, it is necessary to specify both the load and the magnitude of a disturbance in order to determine the transient-stability limit, since the general problem is one of securing a proper balance between mechanical input to a generator and its electrical output and the electrical input to a motor and its mechanical output, it involving not only the electrical quantities which are dependent upon the characteristics of the machines and of the system circuits as a whole, but also mechanical factors, such as machine-rotor inertia, governor operation, and the like.

In the past, it has been necessary, as has been pointed out, to limit the load transmitted over a given system considerably below the static limit, in order to ensure that disturbances will not cause the system angle to increase to a point beyond which recovery is impossible, and, for this reason, it has not been possible to completely realize the full power-transmitting capabilities of any given transmission circuit.

To permit, as before mentioned, the transmission system to be operated at a higher value of steady-state power, I provide means, comprising a specially controlled generator at the receiving end, for limiting the phase displacement of the internal voltages in the sending and receiving-end machines to a safe stable value, which means are illustrated at 30, in Fig. 1.

It will be understood that equipment 30 may be of one of several general designs well known in the art, and may comprise only a single generating unit, or a plurality of units disposed for parallel operation in a well known manner. In the single-line power-system diagram of Fig. 18, which is explained in detail in a later portion of this specification, this last mentioned modification is schematically illustrated.

In the system of Fig. 1, I have illustrated a single generator S, connected to the load-consuming-station bus 18 in the manner shown. Power for driving this generator is supplied by a prime mover 32 of any suitable type, whose input may be controlled in accordance with the magnitude of the system angle. As shown, prime mover 32 is of the type which utilizes motive fluid, such as steam, supplied from any suitable source (not shown) through a pipe line 33, in which is inserted a quick-acting flow-control valve 34 which is capable of making a significant change in the input of the prime mover 32 in a period of time which is short in comparison with the natural period of the system oscillation between the sending and receiving ends of the transmission lines 12 and 13. Valve 34 is normally in a partially open position, as illustrated, to permit sufficient motive fluid to act upon prime mover 32 to drive generator S at synchronous speed, with respect to station bus 18, and allow the generator to float on the line without drawing power from it, or supplying power to it.

It will be understood that valve 34 is represented in schematic form only, no attempt being made herein to show the details of the control device which may be used in practice, since there are several different types of rapid-acting fluid-control valves now known in the art which may be employed in the system of my invention. The paramount characteristic of the entire prime-mover input-control system is rapidity of response, and valve 34 comprises one of the several devices concerned in which time delay in operation should be carefully minimized.

In the event of a system disturbance which causes the system angle to exceed a predetermined value, the input to prime mover 32 is caused to increase at a very rapid rate, through the action of means about to be explained, to thus cause generator S to supply power to the synchronous motor M through the station bus. As will be subsequently shown, this supply of power from an auxiliary source tends to arrest further deviation in the phase angle between the rotors of synchronous generator G at the sending end of the station and synchronous motor M at the receiving end.

Any suitable means for providing pilot voltages to actuate system-phase-angle responsive control means may be utilized in the system of my invention to control the input of the auxiliary prime mover 32. In the embodiment illustrated in Fig. 1, I provide, for the purpose of obtaining such voltages, a pilot generator associated with a synchronous machine at each end of the system. This pilot generator is of such type and the driving connection is so disposed that the voltage generated by it is substantially in phase with the internal voltage of the main synchronous machine under normal load and power-factor conditions when there is no fault. When a fault occurs, the balance between the generator-input and the generator-output is temporarily disturbed, as previously pointed out, and the pilot generator responds instantly to any change in the rotor-phase-position of the main generator or prime mover, before there has been a sufficient change in speed to actuate the most sensitive practically usable speed-governor on the prime mover. Thus, pilot generator 36, shown as mounted directly on the shaft of main generator G, generates a voltage which, at all times, is in substantially fixed phase relation to an internal voltage of generator G, and, similarly, pilot generator 37 generates a voltage substantially in phase with an internal voltage of synchronous motor M, to which it is directly connected.

Any suitable means responsive to phase-angle magnitude, such as a contact-making synchronoscope or the equivalent, may be utilized to control the auxiliary power plant in accordance with the magnitude of the transmission-system phase angle. I prefer to utilize, for this purpose, a modification of the well-known power-factor relay which is shown at 40. Relay 40 is of the general type described in United States Patent 1,565,410, issued to Clarence A. Boddie on December 15, 1925, and assigned to the Westinghouse Electric and Manufacturing Company.

Preferably, the structure of this relay comprises a movable core arm 41 which is controlled by three stationary coils. Two of the coils 42 and 43 are oppositely wound and are connected in series-circuit relation to be energized, in the system of Fig. 1, by the voltage of pilot generator 37. The third coil 44 is located between the two series-connected coils and is disposed for energization by pilot generator 36 at the sending end of the system through any suitable circuit, which is represented by pilot conductors 46 and 46'.

The core armature 41, which is located within the coils, is polarized by central coil 44, in order to be operated in accordance with the direction of current flow through the two series-connected coils 42 and 43. Coil 44 is centrally located with respect to the core armature and can produce no movement of it without the aid of coils 42 and 43. These coils are symmetrically located with respect to armature 41, and, being wound in opposite directions, it is apparent that they can effect no movement of the core member without the aid of the polarizing winding 44.

Pivotally connected to armature 41 is a contact-carrying member 45 which, when actuated upwardly to the position illustrated, brings movable contact member 40a into engagement with stationary member 40c, and, when actuated to the downward position, causes member 40a to engage member 40b to control the operation of a valve-adjusting motor 47, in a manner to be explained.

As illustrated, motor 47, which may be of any suitable type, is disposed, through suitable mechanical connecting means 48, to open or close valve 34, in the motive-fluid line 33 of prime mover 32, in accordance with the respective direction of rotation. Motor 47, shown as being of the well-known split-field-series type, may be energized from any suitable source, such as battery 49. The control scheme illustrated for this motor utilizes two relays 50 and 51, which, upon actuation, respectively energize motor 47 in the valve-closing and valve-raising directions.

Should it be desired to utilize some means other than pilot conductors 46 and 46' to transmit the sending-end representative internal voltage to the phase-angle-responsive device at the receiving end of the system, this may be done, for example, by utilizing carrier-frequency impulses over the transmission line, with the carrier-frequency code arranged to give signals the periodic maximum intensity of which coincides with the maximum value of electromotive force produced by the pilot generator. Other methods, known in the art, are likewise available, as will become apparent.

In operation of the system of Fig. 1, let it be assumed that the phase displacement of the internal voltages of generator G and synchronous motor M is within the stable range, having a value given by angle X in Figs. 2 and 3. The phase difference between the voltages impressed upon coil 44 of relay 40 and series-connected coils 42 and 43 thereof will have a similar displacement, as has been explained. The arrangement of these coils is such that an upward pull will be exerted upon plunger 41 of the relay for such a condition, which pull will be maximum when there is no phase-angle difference between the two energizing voltages and will decrease as the magnitude of voltage phase displacement is increased.

At the angle X, the upward pull is sufficient to maintain movable contact member 40a in engagement with stationary member 40c against the force of gravity or other downwardly acting force. However, as the phase angle increases to the value indicated by X2 in Fig. 4, the force has decreased sufficiently to permit contact member 40a to move downwardly, which downward movement continues with increasing phase displacement until the displacement has attained the angle X3 of Fig. 4, when the member 40a has dropped downwardly into engagement with stationary contact member 40b. Relay 40 maintains this position for all higher phase-displacement angular values.

For the steady-state power transfer condition illustrated by Po in Fig. 3, valve 34 of prime mover 32 normally reposes in the downwardly actuated position illustrated which, as before mentioned, is such as to cause generator S to "float" on station bus 18.

In the event of a disturbance upon the system which causes the phase angle to increase to the value X3 of Fig. 4, contact member 40a of relay 40, is caused to engage contact member 40b. This energizes valve-opening relay 51 through a circuit which extends from positive terminal of battery 49, through conductor 53, contact arm 45, contact members 40a and 40b of relay 40, conductor 54, winding 55 of relay 51, conductor 56, closed limit switch 57 of valve-opening mechanism 48 and conductor 58, to the negative terminal of battery 49.

Thus energized, the movable member of relay 51 is actuated upwardly, completing, through its contacts, an energizing circuit for motor 47 which extends from battery 49, conductor 53, closed contact 60 of relay 51, section 61 of the motor field winding, motor armature 62 and conductors 63 and 58, to battery 49.

Thus energized, motor 47 rotates in the valve-opening direction, and, through the rack-and-pinion mechanism 48, shifts movable member 65, of valve 34, upwardly, thereby opening the valve and admitting a greater volume of motive fluid into prime mover 32.

Energization of motor 47 continues until such time as the valve has reached the completely-open position when limit switch 57 is opened to interrupt the energizing circuit of coil 55 of relay 51, thereby permitting this relay to again move to the unactuated position shown.

As the auxiliary-power plant at the receiving end of the line is thus caused to supply power to station bus 18 and synchronous motor M, the action is to arrest further deviation of the system-voltage phase angle and thus maintain synchronism. Assuming that the effects of the disturbance gradually die out to permit the system phase angle to again decrease towards the normal value, contact member 40a of relay 40 will be moved out of engagement with contact 40b and, at the time that the angle has decreased to the value indicated by X2, in the curves of Fig. 4, member 40a will have engaged valve-closing contact member 40c.

This action completes an energizing circuit for relay 50 which extends from battery 49, through conductor 53, contact arm 45, contacts 40a and 40c of relay 40, conductor 67, winding 68 of relay 50, conductor 69, limit switch 70, which is closed when the valve is in the open position, and conductor 58, to battery 49.

Thus energized, relay 50 actuates the movable member thereof upwardly to complete, through its contacts, an energizing circuit for motor 47 which extends from battery 49, conductor 53, closed contact 72 of relay 50, section 73 of the motor field, motor armature 62 and conductors 63 and 58, to battery 49.

Thus energized, motor 47 rotates in the valve-closing direction to move member 65 of valve 34 downwardly towards the closed position. This downward movement continues until such time as travel limit switch 70 is actuated to the open position shown to interrupt the energizing circuit of relay 50, thereby permitting this relay to return to the unactuated position illustrated, to thereby deenergize motor 47 and arrest further movement of the valve.

In order that a fluttering or a premature opening of the contacts of control relay 40 may not act to burn the control-relay contacts or to stop the adjustment of valve 34 in an intermediate position, I provide motor-control relays 50 and 51 with holding-circuit contact members 75 and 76, respectively, which act to bridge the contacts of relay 40 upon the closure of the motor-control relays with which they are associated, and to remain closed until one of the limit switches 70 or 57, as the case may be, deenergizes the relay 50 or 51, whichever was energized. This ensures that an opening or closing operation of valve 34, once started, will be completed, regardless of the subsequent action of phase-angle-responsive relay 40, following the initiating impulse thereof. It will be apparent, therefore, that, after contact member 40b of relay 40 is engaged by contact member 40a, valve 34 will be completely opened and will remain in this position until contact 40c is reengaged by member 40a. Likewise, after contact member 40c is engaged by member 40a, valve 34 will be completely closed and will remain so until member 40b is again engaged by member 40a.

Should it be found desirable, the valve-operating motor-control scheme may be modified to a form which utilizes anti-hunting means disposed to act directly in the winding circuits of phase-angle-responsive relay 40, as it will be apparent that any scheme which properly controls the prime mover input in response to relay actuation fulfills the necessary requirements.

That beneficial results, as regards stability improvement and power-limit increase, are afforded by the system of my invention, when combined with power-transmission systems, will be further apparent from a consideration of the step-by-step phenomena which results from the occurrence of a typical transient or disturbance upon a representative power system. For the purpose of such consideration, the system of Fig. 1, illustrated in Fig. 5 in a simplified single-line diagrammatic form, may first be investigated.

In Fig. 5, the prime mover and generator at the sending end of the system are illustrated at 20 and G, respectively, the step-up transformer bank at 16, the parallel transmission lines at 12 and 13, the step-down transformer bank at 17, and the synchronous motor and shaft load, at the receiving end of the system, at M and 78. The phase-angle-controlled generating equipment located at the receiving end, in accordance with my invention, is represented by the generator S, prime mover 32 and the special phase-angle-responsive prime-mover control means 80.

Referring again to the curve of Fig. 3, an examination of the diagram will reveal that when the power system considered is operating at a stable point, as at $a$, the occurrence of a disturbance sufficient to carry the system angle beyond the point $b$, pull-out will necessarily occur. If, on the other hand, the oscillation does not carry the system to the point $b$, the system will remain stable and ultimately reach equilibrium at the point $a$, assuming, of course, that the circuit conditions have not, in the meantime, been changed. Such general discussion applies, as will be seen, to the operating conditions either for the initial condition, that is, the one prior to a disturbance, or equally well to the condition following the disturbance.

It will be appreciated that a variety of conditions may exist from the standpoint of system stability and disturbance conditions since, as has been mentioned, system disturbances are of several kinds. The principal conditions of operation, however, which tend to produce loss of synchronism in a power system are (a) line switching, (b) load swings, and (c) system faults. The line switching in the system of Figs. 1 and 5 will correspond to the disconnection of one of the transmission lines 12 and 13, which removal from active circuit will be seen to decrease the power-carrying capacity of the circuit connecting generator G and the motor M. It will be recognized that line switching thus involves a change in the circuit characteristics, the magnitude of this change depending upon the characteristics of the circuit switched in or out, with reference to the characteristics of the total system.

Load swings differ from switching operations in that the circuit constants remain substantially the same, and the input and output vary, whereas, with switching, the input and output remains substantially the same, and the circuit conditions are changed. The effects, however, as will be shown subsequently, may be similar, as regards the change in magnitude of the system angle.

Line faults, and principally short-circuits, present, in general, more complication than do the switching operations and load swings because of the fact that three distinct networks are involved, namely, (a) the original condition prior to the application of the short circuit or fault, (b) a second condition while the fault is on the system, and (c) a third condition when the fault has been cleared, usually by a switching operation.

The second condition is what makes the fault analysis or effect radically different from switching conditions or load swings. The fault may increase or decrease the power output of the generator at the sending end of the line, according to its particular nature. Oscillograph tests on actual systems show that, under some conditions, the faults actually load up the generators, and pull-out tends to occur on the "over-swing", whereas, with other systems, it appears that the generator always decreases its load and tends to accelerate on the occurrence of the fault.

In present-day transmission systems, it is found that by far the greater percentage of faults are from line to ground and most of the remainder are from line to line, the three-phase short-circuit faults occurring but rarely. Hence, for the purpose of this discussion, a line-to-ground fault may be assumed as typical. We will, therefore, assume the occurrence of such a fault on the transmission system and first consider the case in which no special stabilizing means are utilized and follow the mechanism of pull-out or loss of synchronism for a given load, and then insert the phase-angle-controlled auxiliary-power plant of this invention at the receiving end of the system and again follow the action.

In the discussion to follow, the typical fault considered will be assumed to decrease the power output of the main generator G to some intermediate value. It will further be assumed that, after the occurrence of this fault, on one of the two transmission lines in the system of Fig. 5, the circuit breakers at both ends of that line are simultaneously opened after a given predetermined time.

As will be seen, the following through of the occurrence and clearance of such a fault involves, to a large extent, all of the principal conditions named as tending to produce instability, hence, no separate analysis of line switching and load swings by themselves is necessary.

Referring to Fig. 7, curve A is the power-angle diagram of the system of Fig. 5 when both transmission lines 12 and 13 are in active service. A given load, indicated by P', is assumed to be supplied by generator G to motor M which, disregarding losses, may also be taken as the power input to generator G and the output of motor M. The initial operating condition results in the phase displacement shown by X'.

It will be understood that the governing means which control the power input to generator G is of the usual speed-change responsive type, so that small angular shifts in the machine rotor are not capable of immediately affecting substantial operation or action of this governor. Hence, for the majority of faults and other disturbances that are actually encountered on power systems, the effect of the main-generator governor operation may be ignored, and a constant value of power input may thus be assumed.

Similarly, the very small changes in speed or relative rotor position of motor M resulting from ordinary system disturbances do not materially change the mechanical output of the motor, so that a constant value of motor output may also properly be assumed. The assumption that both the motor output and the generator input remain constant throughout the progress of the disturbance, and the reactions which it sets up, will, therefore, be made in the following analysis.

For purposes of this discussion, the single power-angle diagram of Fig. 7 or Fig. 8 may apply to either generator G or motor M, since it will be seen that, for the portion of the system shown in full lines in Fig. 5, now being considered, separate diagrams for both machines will be substantially alike.

Power-angle diagrams of the type illustrated in Figs. 3 and 7 to 14 do not show time. Therefore, for the final results, it is preferable to use curves with time as abscissas, since stability depends upon factors which are functions of time. The angle between the electromotive forces at the two ends of the system, or the variation in the angle as a function of time, gives a very satisfactory criterion of stability. The curves of Fig. 6 illustrate this method of representation and will be utilized in the general discussion.

In the event of a fault of the type described occurring upon line 13 of the system of Fig. 5, as is indicated at 79, the diagram of the system is modified to the form indicated by curve B of Fig. 7, which indicates that the power-transmitting capacity of the system has been reduced thereby.

Because of the mechanical inertia of the moving parts of the synchronous machines, the system angle does not immediately change, so that, upon the application of the fault, the generator output drops from $d$ to $e$. The power represented by $d$—$e$ is thus available for accelerating the generator rotor, hence, the generator tends to speed up, and the system angle thus increases.

Similarly, the fault application causes the power delivered to the motor M to drop from $d$ to $e$ and this deficiency causes the load carried by the motor, assumed to remain constant, to decelerate the motor rotor so that its internal voltage thus further lags behind the generator or sending-end internal voltage.

The speeding up of the generator and the slowing down of the motor cause the system angle to change from the original value X' to an increasingly larger value. During this increase, the fault condition is assumed to be cleared by the opening of circuit breakers 81 and 81', which disconnect the faulted line from the active circuit and permit only line 12 to remain connected.

In the curves of Fig. 6, this given definite time of fault clearance is indicated at 82, it being assumed that the fault condition is thus cleared before the system angle has advanced to the critical value. In the case considered, such clearance is assumed to occur at a time when the angle has advanced to the value given by Y' in Fig. 7.

In a copending application of Robert D. Evans et al., Serial No. 403,390 filed October 30, 1929, and assigned to the same assignee as this application, is described a protective system for transmission lines involving high-speed breakers capable of isolating a faulted line in considerably less time than the value assumed herein. It will be apparent, therefore, that the fault-clearance time arbitrarily chosen is practical and easily attainable through the use of equipment known in the art. However, this feature, in itself, does not constitute a part of this invention, as will be understood.

In Fig. 7, area $d$—$e$—$f$—$g$ represents the energy stored in the generator rotor tending to drive it above the original synchronous speed and it likewise represents the energy taken by the load from motor M tending to slow it down below the original speed.

When the fault has been cleared, the system diagram assumes a third position, which is indicated in Fig. 8 by curve C, it being understood that curve C refers to the system power-transmitting characteristics afforded by transmission line 12 alone, faulted line 13 having been isolated.

At the time of the fault clearing, the system angle has the value Y', for, as in the preceding action, the mechanical inertia of the machine rotors prevents their relative positions from changing immediately. For this condition, the generator output is that designated in Fig. 8 at point $h$, the input still remaining the original value P'. Hence, the output of generator G exceeds the input by the value $h$—$k$, and there is a tendency for the generator to feed the excess energy stored in its rotor, and represented in Fig. 7 by the area $d$—$e$—$f$—$g$, into the transmission system. Likewise, the motor input will now exceed the output by the value $h$—$k$ and the final tendency will be for motor M to regain speed.

However, since the generator rotor has an excess of stored kinetic energy, and the motor a deficiency of stored energy of rotation, the phase angle between the two internal voltages of these machines will continue to increase until the energy values have again been equalized. Such equalization will obtain when the system angle has further increased to the extent that the area $h$—$k$—$l$—$m$ in Fig. 8 is equal to the area $d$—$e$—$f$—$g$ in Fig. 7, which will be seen to be the case when the system angle reaches the value Y'' in Fig. 8.

At this point, further increase in the angle is automatically arrested, and the system tends to return to a new angle X'', determined by the intersection of curves C and P' at point $n$ in Fig. 8. This tendency results from the fact that the critical angle determined by point $q$ in Fig. 8 was not attained. Had this value of system angle been exceeded, stability recovery would have been impossible.

However, since the limiting angle was Y'', at which the generator output exceeded the input, by the value $l-m$, and the motor input exceeded the output by the same value, the tendency was for the generator to slow down and the motor to speed up, with the result that the rotor angle decreased, and eventually came to rest at point $n$, before mentioned.

It will be apparent that, had the original value of power transmitted through the system been somewhat greater than that given by P', loss of synchronism would have occurred during the conditions just described. This situation is illustrated in Figs. 9 and 10 in which the original power input to the system is given by P and the original system angle by $X_1$.

Occurrence of fault 79, on line 13 in the system of Fig. 5, produces a cycle of operations similar to those explained in connection with Figs. 7 and 8, the time of clearing assumed to be the same as before and resulting in a system angle, at the time of clearance, of $Y_1$. In this case, the excess energy stored in the generator rotor and taken from the motor rotor is given by the area $d'-e'-f'-g'$, which, it will be seen, is greater than the corresponding area in Fig. 7, due to the increase in the original system load.

At the time of fault clearance, the power output of generator G, and the input of motor M, is given by $h'$ in Fig. 10. Due to the difference in the stored energies, in the machine rotors, the angle further increases from the original fault-occurring value $Y_1$ to a larger value. Since the area $h'-k'-q'$ is considerably less than area $d'-e'-f'-g'$, equalization has not been effected at the time that the angle has reached the critical value $q'$ and further increase thus results. Consequently, the two machines fall out of step, since any angular value in excess of that corresponding to value $q'$ causes the generator output to be less than the input P, and the motor input to be less than its output P, so that the speeds of the rotors of the two machines tend to drift farther and farther apart and fall out of synchronism.

In the curves of Fig. 6, this latter condition may be represented by curve 83, while the former condition, discussed in connection with Figs. 7 and 8 in which loss of synchronism did not result, may be represented by curve 84. In Fig. 6 the initial system angle is given by horizontal line 85 and the final stable angle, after the occurrence and clearance of the fault by line 86.

Considering now the utilization of the phase-angle controlled generator at the receiving end of the line and its effect in the improvement of stability, curves of Figs. 11 to 14, inclusive, have been drawn for the system of Fig. 5 when subjected to the same fault, and subsequent clearance thereof, as was discussed in connection with Figs. 9 and 10 in which, at the given system loading P, loss of synchronism occurred after the clearing of the fault.

Particularly, due to the action of the synchronism-maintaining generator S at the receiving end, the disturbance will effect the sending and receiving ends of the system in different ways. Consequently, in the analysis which is to follow, it will be necessary to employ separate power-angle diagrams, in studying conditions during disturbances, for the two ends of the system.

Thus, the curves of Figs. 11 and 13 apply to the sending end of the line, or generator G, while the curves of Figs. 12 and 14 apply to the receiving end of the line, or motor M and auxiliary generator S.

The initial operating condition is given, as in Fig. 9, at point $d'$ in Fig. 11, this point of intersection of curve A with system-input line P giving the initial generator output. At the motor end of the system, line L in Fig. 12, equal in magnitude to input P, defines the output of motor M, the input being given at point $d''$. This is the original operating condition, assuming that generator S initially delivers no power to the system, and will be seen to correspond to a phase-displacement angle of $X_1$.

Upon occurrence of the fault 79, the power delivered to the transmission system by the generator G drops to point $e'$, in Fig. 11, and the power received from the system by motor M drops to point $e''$, on Fig. 12. The decrease in the power output of generator G and the power input to motor M causes the receiving-end voltage to further displace itself with respect to the sending-end voltage, and the system angle, therefore, increases. At the time when it has reached value $Y_1$ the faulted line 13 has been disconnected.

When the angle between the generator and the motor attained value $X_3$ in Figs. 4 and 12, the special control, symbolically indicated at 80 in Fig. 5, operated to increase the input to generator S, so that it started to supply power to motor M. The equivalent curve of motor input is thus changed from the shape given by B, to that defined by line $r-t$ in Fig. 12, which indicates that generator S starts to supply load at $r$, increasing its output until, at point $t$, which corresponds to the clearing of the fault at angle $Y_1$, it is supplying power to the extent measured by distance $f''-t$. Consequently, the power-angle diagram for the receiving end corresponds to the curve passing through the points $e''$, $r$ and $t$. The area defined by points $r$, $f''$ and $t$, represents the energy which has been put into the receiving system tending to prevent the increasing of the angle between generator G and motor M.

Figs. 13 and 14 represent the corresponding power-angle diagrams following the clearing of the fault. In Fig. 13, the angle initially corresponds to $Y_1$, curve C applying to the system after faulted transmission line 13 has been disconnected, as before explained in connection with Figs. 8 and 12. The sending-end input is defined by line P, which has the same value as in the previous diagrams.

Initially, power input to the generator is defined by point $k'$ and its output by point $h'$. Due to the fact that the generator rotor received an excess of energy during the presence of the fault, and the motor rotor gave up a part of its normal energy, the system angle continues to increase to some higher value, the energy represented by area $k'-h'-g'$ being insufficient to absorb the energy represented by area $d'-e'-f'-g'$ in Fig. 11.

Considering now Fig. 14, which applies to the receiving end of the line, the load is defined by line L. On the clearing of the fault, the basic power-angle diagram is given by curve C, as in Fig. 13. However, at the time of fault clearance generator S is feeding power into the receiver system so that the total power delivered to motor M is defined by curve D of Fig. 14 with the distance $h''-u$ corresponding to distance $f''-t$ of Fig. 12.

It will be appreciated that generator S requires a certain time in which to take on full load, hence, at the time of the clearing of the fault, it may be operating at less than full capacity. Assuming such to be the case, after the clearing of the fault, it continues to increase its load, as along the line $u$—$v$ of Fig. 14, so that, when the system angle has advanced to the value $Y_2$, the total power delivered to the motor M is defined by curve E.

On clearing the fault, the input to motor M, defined by point $u$ of Fig. 14, is in excess of the load L. However, due to the difference in the stored energies in the machine rotors, previously mentioned, the angle of the system tends to further increase to a greater value, as before explained.

An analysis of the diagrams will indicate that the angular displacement will continue to increase until the stored energies in the rotors of generator G and motor M have again become equalized. Such a condition obtains when the area $d'$—$e'$—$f'$—$g'$ of Fig. 11, plus the area $q'$—$w$—$y$ of Fig. 13, plus the area $d''$—$e''$—$r$—$t$—$g''$ of Fig. 12 equals area $h'$—$q'$—$k'$ of Fig. 13, plus area $k''$—$u$—$v$—$z$ of Fig. 14. Examination of the diagrams will show that such equalization is effected when the displacement attains the value given by $Y_2$ in Figs. 13 and 14.

A condition of equilibrium thus having been reached, when the system angle reaches value $Y_2$, further increase in the phase angle between generator G and motor M is stopped. With pull-out prevented, the system tends to return to a lower value of operating angle and to accelerate in speed, since the sum of the outputs by generators G and S is in excess of the power required of motor M to supply load L.

Normal speed will be resumed, due to the operation of the governor of generator G, which may reduce its input, and to the reduction in the input to generator S, due to the action of the special governor control already explained, or else to a supplementary governing means disposed to act in the usual speed-responsive manner after the system disturbance has subsided. The final steady-state condition, after power supply from auxiliary generator S has been discontinued, will be determined by the intersection of curve C with lines P and L, in Figs. 13 and 14, which results in a final system angle of value $X_4$.

While only one particular set of operating and transient conditions has been assumed for this analysis, it will be evident that similar power-limit and stability improvement is obtainable for the case of other conditions and transient disturbances not specifically analyzed herein.

From this discussion, it will be evident that, through the utilization of my invention, any given transmission system is permitted to operate at a higher value of steady-state power transfer, since, for a given value P, transmitted by the representative system considered, loss of synchronism occurred for one typical system fault when no auxiliary power supply was made effective at the receiving end during the disturbance, whereas, with the utilization of my invention, a step-by-step analysis of the same operating and disturbance condition proved that synchronism could be maintained for the same value of steady-state power transfer.

As has been pointed out, my invention is not limited, in its application, to power systems which comprise only a single synchronous machine at either end, but it may be applied with equal success to situations in which extensive electrical systems, each comprising a plurality of synchronous machines, generators, motors or both, as well as other types of electrical load, are connected by transmission lines or tie-line circuits. Such an interconnection is diagrammatically illustrated in Fig. 15 in which "System I", illustrated as comprising generators $G_1$ and $G_2$ and a synchronous motor $M_1$, is connected through tie-line circuits 95 with "System II", which is illustrated as comprising generators $G_3$ and $S_1$, motor $M_2$, and other types of electrical load (not shown), supplied from the system bus.

In Systems I and II, the dotted sections of the main-power circuit shown as connecting the individual units will be understood to represent interconnecting means of any of the various types well known in the art, and further to indicate the fact that the several units need not necessarily be located in the same station. Thus, while each of the systems is shown in the relatively compact manner, in reality, the separate units thereof may be located in different stations, which are separated by appreciable distances and appropriately interconnected.

In order to improve the stability and power limits of interconnecting tie-lines 95, generator $S_1$ of system II is disposed to be controlled in accordance with the phase displacement between representative voltages of the two systems. The prime mover 130 for this generator is, accordingly, arranged to be controlled in accordance with the operation of phase-angle-responsive relay 131 which is energized by the two control voltages named.

As illustrated, prime-mover input-control valve 132 is normally in some intermediate position to allow sufficient motive fluid to flow to cause generator $S_1$ to supply an intermediate value of power to system II. For purposes of explanation, such a condition will be assumed to correspond to the normal value of phase displacement between the two system voltages.

To provide means for supplying control-voltages to the phase-angle-responsive relay 131, which voltages will be representative of the internal voltages at the sending and receiving ends of the circuits to be benefitted, any one of several methods known in the art may be utilized. In Fig. 15, I have shown, for this purpose, positive-phase-sequence voltage equipments 99 and 99' connected to representative points in the sending end and the receiving end system circuits. Each equipment or network comprises transformers 96, a resistor 97 and a reactance 98 disposed in the manner shown. Such a positive-phase sequence network is described in detail in United States Patent No. 1,571,224, issued February 2, 1926 to C. T. Allcutt, and assigned to Westinghouse Electric and Manufacturing Company.

The ordinary single-phase voltages frequently used for relay purposes are not desirable for use with a system such as is described herein because the operation of the system must be accurate and positive, particularly at the times of system disturbances when it is brought into active use. It is generally recognized that single-phase voltages taken from a polyphase system are unreliable at such times, since the phase relations of the voltages may be disturbed, and the voltages, in certain of the phases, be greatly distorted. A positive sequence voltage, on the other hand, is substantially correct for all conditions, even when the system is subjected to a heavy disturbance.

In the system of Fig. 15, it will be apparent that the voltages which act upon phase-angle-responsive relay 131 are determined, in their phase relation, by the positive-sequence voltages in the system busses at the two ends of the tie-line circuits, rather than the internal voltages of any particular machines. Consequently, the phase shift due to the machine reactances does not directly influence the phase-angle responsive device. However, for any given system, it is readily possible to so compensate relay 131 in its calibration that the machine reactances may be properly taken into account, and the special control may be effected in an entirely satisfactory and reliable manner, as in the case of the system of Fig. 1, already explained in detail, except, of course, for three-phase faults at the system busses.

For purposes of explanation, it will be assumed that a flow of power normally takes place from system I to system II and that the voltage acting in system I, therefore, leads, in phase position, the voltage acting in system II by an angle which depends upon the magnitude of this power interchange.

Relay 131 may be similar to relay 40 shown and described in connection with the system in Fig. 1. As illustrated in Fig. 15, a tension spring 134 is attached to the movable contact arm of the relay in such manner that, for the normal value of system phase angle, the movable contact member 131a will be maintained in a floating or disengaged position intermediate stationary contact members 131b and 131c of the relay.

When the phase displacement between the voltages in systems I and II is caused to exceed this normal value, the upward pull on the armature of relay 131 decreases, and spring 134 is allowed to move contact member 131a downwardly into engagement with member 131b. This completes a circuit which extends from battery 136 through conductor 137, contact members 131a and 131b of relay 131, winding 138 of an anti-hunting relay, conductor 139, winding 140 of valve-operating-motor relay 141, limit-switch contacts 142, conductor 156 and conductor 143, to battery 136.

Thus energized, relay 141 actuates the movable element thereof upwardly to complete an energizing circuit for valve-operating motor 145 which extends from battery 136, through conductor 137, conductor 144, relay-contact member 146, field winding 147 and armature 148 of motor 145 and conductors 149 and 143, to battery 136.

Valve-operating motor 145 is thereby energized in a manner which causes it to rotate in a valve-opening direction to cause valve 132 to increase the flow of motive fluid to prime mover 130 and thereby cause generator $S_1$ to supply more power to system II.

This increase in power supply has the effect of decreasing the displacement between the voltages in systems I and II and, as a result of this decrease, phase-angle-responsive relay 131 is permitted to disengage contacts $x'$ and $o'$, and control motor 145 is, accordingly, deenergized, and the opening action of prime-mover valve 132 is, consequently, stopped.

Similarly, should the system phase angle become less than the desired value, relay 131 will move contact member 131a upwardly into engagement with member 131c to complete a circuit which extends from battery 136, conductor 137, contact members 131a and 131c of relay 131, winding 151 of an anti-hunting relay, conductor 152, winding 153 of motor-control relay 158, conductor 154, limit-switch contacts 155 and conductors 156 and 143, to battery 136.

Relay 158, thus energized, actuates the movable element thereof upwardly to complete an energizing circuit for motor 145 which extends from battery 136, through conductor 137, contacts of relay 158, field winding 159 and armature 148 of the motor and conductors 149 and 143, to battery 136.

Thus energized, motor 145 rotates in a valve-closing direction to thereby cause input-control valve 132 to reduce the flow of motive fluid to prime-mover 130 and decrease the power output of generator $S_1$.

The effect of this decrease is to cause the displacement between the voltage in systems I and II to increase and, as a result, relay 131 is permitted to move contact member 131a out of engagement from member 131c to thereby deenergize motor 145 and arrest further closing action of valve 132.

It will thus be seen that the system illustrated in Fig. 15 is capable of regulating the input to prime-mover 130, during system disturbances, in such manner that the magnitude of voltage displacement between systems I and II will tend to be maintained at a given predetermined value. Adjustment of this value may be effected in any one of the several ways well known in the art, such as by the insertion in the circuit of the phase-angle-responsive relay windings a device for changing the relative values of resistance and reactance of the circuit.

In Fig. 15, such a device is illustrated at 161, comprising a resistance element 162 and an inductive reactance element 163, connected through an adjustable contact-making member 164. Rotation of the member 164 in a clockwise direction, for instance, acts to decrease the inductance and increase the resistance effective in the circuit of the two outer windings of relay 131 to thereby change the calibration of the relay in well known manner.

To prevent overshooting of the corrective action, any suitable anti-hunting means, such as illustrated, may be inserted in the control circuits of phase-angle-responsive relay 131. As shown, a resistor is included in the circuit of the middle winding of device 131, and sections 167 and 168 of this resistor are arranged to be short circuited and open circuited, respectively, by the actuation of two relays, the windings 151 and 138 of which were previously mentioned. It will be observed that, for the floating position of contact member 131a of relay 131, neither anti-hunting relay will be energized, and, for this condition, section 167 only of the resistor is included in the winding circuit of relay 131.

Engagement of phase-angle-responsive-relay contact members 131a and 131b energizes relay winding 138 and causes the contact member thereof to rise, thereby inserting resistor section 168 into the control voltage circuit. Similarly, engagement of phase-angle-relay contact members 131a and 131c energizes anti-hunting relay winding 151 which actuates to short circuit the normally open circuited resistor section 167, so that neither resistor section will be included in the phase-angle-relay winding circuit.

An analysis of the system operation will indicate that these two respective actuations of the anti-hunting relays function to slightly change the phase position of the voltage acting in the central winding of phase-angle relay 131 in such direction that the relay tends to move its contact members out of engagement somewhat in advance of the time when the desired readjustment of phase displacement between the voltages in systems I and II has been effected, and in this manner, prime-mover input-control valve adjustment changes are prematurely arrested.

Means (not shown) are used for rapidly stopping valve-adjusting motor 145, after deenergization thereof has been effected and may be combined with the motor in a well known manner to further ensure stable operation of the regulating system.

The limit-switch contacts, 142 and 155, hereinbefore mentioned, will be understood to open when the limit of travel of prime-mover-control valve 132 has been reached in the opening and closing directions, respectively, to ensure that deenergization of valve-operating motor 145 shall take place when no further valve adjustment in either direction can be effected.

Instead of the positive phase-sequence networks illustrated in Fig. 15, at 99 and 99', other means may be utilized to provide the composite machine voltages necessary to actuate the phase-angle-responsive relay. Thus, a pilot generator may be connected to the shaft of a representative machine at each end of the tie-line circuits, and electrical connections made with the relay in the manner shown in Fig. 1.

Likewise, if it is desired or found preferable, the pilot generator may be driven by a special low-inertia type of synchronous motor energized from a respective point in the main circuit at either end of the system. This modification is shown in Fig. 19, the pilot generator being represented at 100, and the special low inertia driving motor at 101. The motor 101 and the generator 100 may be designed to have an extremely low rotative inertia, so that their rotors will closely follow the exact phase position of the voltages in the system bus to which the motor is connected.

Another method for obtaining, from multi-machine stations, or systems, suitable voltages for actuating the phase-responsive relay, is illustrated in Fig. 16. The interconnected systems there shown in a simplified single-line diagrammatic form, will be seen to be similar to those of Fig. 15. Each of the plurality of machines $G_1$, $G_2$ and $M_1$ in system I, at one end of tie-line circuits 95, is provided with a pilot generator, and each of the machines $G_3$ and $M_2$, in system II at the other end of the circuits, is provided with a similar pilot machine.

The phase-angle-responsive governing means, indicated at 80, which controls the prime-mover input of system II generator $S_1$ in the manner already explained may be acted upon by the composite-phase position of the internal voltages of the several machines at each end of the circuits. Thus, pilot generators 104, 105 and 106, at one end, are connected in series relation to influence governor 80, while pilot machines 107 and 108, at the other end of the circuits, are similarly connected in the manner shown. It will be recognized that the voltage from system I, which thus influences governor 80, will have a composite phase position determined by the average rotor position of the several machines $G_1$, $G_2$ and $M_1$. Likewise, the voltage impressed upon the governor from system II will have a phase position determined by the average position of rotors of machines $M_2$ and $G_3$. In this manner, the composite phase angle of the several machines named is caused to control the operation of stability-preserving generator $S_1$ in system II.

Another method of composite phase-angle determination, utilizing the system voltage as a resultant of the voltages of all of the generators connected thereto, is described in my copending application, Serial No. 306,827, filed September 19, 1928, and assigned to the same assignee as this invention.

It will be understood by those skilled in the art that any suitable connection of the plurality of pilot generators, at either end of the system, may be utilized to obtain the desired composite voltage.

In Fig. 17, I have illustrated my invention applied to a power system interconnection comprising a plurality of generators in system III, which supply, through transmission circuits 102, a distribution-circuit network, shown generally at 110, included in system IV. Such networks are well known and are extensively used in the art. The one illustrated in Fig. 17 comprises a plurality of interconnected circuits 111, 112, 113, 114, 115 and 116 joined together at a number of points in the manner shown. Each of these circuits supplies a load (not shown) which may comprise lighting, power, and other types of current-consuming devices.

To obtain the true phase position of the average voltage acting in this distribution network, it is necessary that measurements or indications be taken at a plurality of representative points therein, and a composite potential then be utilized to influence governing means 80 of the synchronism-maintaining generator $S_2$ in system IV. To accomplish this, I connect, at each of the points so chosen, a positive-phase sequence voltage equipment of the type illustrated at 99 in Fig. 15. In Fig. 17, these equipments are represented at 118, 119, 120, 121 and 122. The output terminals of each give a voltage which shows the average of the three-phase voltages at each of the connected points.

The phase position of the voltage of the complete network 110 may be derived by suitably combining, as by means of the series connection shown, the several positive phase voltages. The composite potential thus obtained may then be impressed upon phase-angle-responsive governing device 80.

It will be evident, therefore, that generator $S_2$ in system IV of Fig. 17, will be controlled in response to the deviation of the composite-voltage phase position of generators $G_4$, $G_5$ and $G_6$ from that of the composite-voltage phase position of distribution network 110.

Frequently, transmission systems supply load circuits to which are connected synchronous machines in addition to lighting and various other types of load supplied by a distribution network. Such a situation is illustrated in Fig. 18 in which system VI comprises one or more synchronous machines $M_4$ and a distribution network 125. In order to influence the phase-angle-responsive stability-improving generator, by a voltage which is representative of the entire load circuit, a pilot generator 126 on each of the synchronous machines $M_4$ may be connected in series with positive phase-sequence voltage equipments 127, 128 and 129 in the distribution network in the manner shown. It will be apparent that a thoroughly representative distribution-system voltage may thereby be obtained for influencing control means 80.

In cases in which it is desired to utilize a plurality of generating units, controlled by phase-angle-responsive means in a manner to maintain stability, the control means of the several units may be suitably interconnected to permit simultaneous operation thereof. Such a connection is illustrated in Fig. 18 in which two such generating units S₃ and S₄ are shown, a parallel connection of the control circuits for governing means 80 and 80', respectively, there being indicated.

Should it be found desirable, phase-angle controlled generating units may be disposed in different parts of the complete system, such as at both the sending and the receiving ends of a transmission or system tie-line circuit. In Fig. 18, this modification is likewise illustrated. In addition to phase-angle-control generators S₃ and S₄ in system VI, already mentioned, one or more similarly controlled generating units S₅ may be disposed in system V at the other end of tie-line circuits 175, and its prime-mover phase-angle-responsive governing means 176 may be energized by the voltage of the two systems in the manner shown. In this case, however, the power-input to the sending-end generator S₅ is decreased upon an increase in the measured phase-angle.

It will be understood by those skilled in the art that still further combinations and applications of the stability and power-limit-improving system of my invention may be made. Hence, although I have shown and described certain specific embodiments of my invention, I am fully aware that many further modifications thereof are possible. My invention, therefore, is not to be restricted except insofar as is necessitated by the prior art and by the spirit of the appended claims.

I claim as my invention:

1. In an alternating-current system, a power circuit, a dynamo-electric machine connected to said circuit, a prime mover for driving said machine, and means for increasing the stability of said system comprising electro-responsive means for modifying the flow of motive fluid to said prime mover, and a relay unresponsive to normal phase-angle changes and operative only upon abnormal power-circuit phase-angle conditions to energize said electro-responsive means.

2. In an alternating-current transmission system, a power circuit, translating means comprising an electrical generator connected to the power circuit and a prime mover for driving the generator, and means unresponsive to normal phase-angle changes and operative only upon abnormal power-circuit phase-angle conditions for modifying the relation between the power input to and the power output from said power-translating means with respect to the rest of the transmission system to increase the stability of the transmission system.

3. As a means for increasing the stability and the power limits of an electrical system comprising an alternating-current generating station at the sending end, a power-transmission circuit connected thereto, and a power-consuming circuit at the receiving end energized by said transmission circuit, the combination with said system, of electro-responsive generating means at the receiving end disposed to suddenly supply a large amount of power to said power-consuming circuit when the phase displacement between representative internal voltages of the sending-end generating station and the receiving-end load-consuming circuit exceeds a predetermined magnitude.

4. A synchronous-synchronous transmission-line system having means for introducing temporary corrective measures for assisting in preventing loss of synchronism during transients, characterized by phase-angle-responsive means unresponsive to normal phase-angle changes and responsive only to predetermined excesses in phase-angle, for initiating said temporary corrective measures.

5. A synchronous-synchronous transmission-line system having means for introducing temporary corrective measures for assisting in preventing loss of synchronism during transients, characterized by means unresponsive to normal phase-angle changes and responsive only to a predetermined degree of change in the phase-angle of an instrumentality at one end of the line, as compared to an instrumentality at the other end, for initiating said temporary corrective measures.

6. The invention as specified in claim 4, characterized by said phase-angle-responsive means comprising a phase-indicating means driven from the shaft of one or more synchronous machines of the system.

7. The invention as specified in claim 4, characterized by said phase-angle-responsive means comprising a pilot generator driven from the shaft of one or more synchronous machines of the system.

8. The invention as specified in claim 4, characterized by said phase-angle-responsive means comprising a phase-sequence network connected in operative relation to the line, at at least one point thereof, for deriving a single-phase relaying current responsive to a symmetrical phase-sequence component of the line.

9. The invention as specified in claim 4, characterized by said phase-angle-responsive means comprising a phase-sequence voltage-network connected in operative relation to the line, at at least one point thereof, for deriving a single-phase relaying current responsive to a symmetrical phase-sequence component of the line-voltage.

10. The invention as specified in claim 4, characterized by said phase-angle-responsive means comprising a positive-phase-sequence voltage network connected in operative relation to the line, at at least one point thereof, for deriving a single-phase relaying current responsive to the positive-phase-sequence component of the line-voltage.

11. The invention as specified in claim 4, characterized by said phase-angle-responsive means comprising a plurality of instrumentalities for obtaining phase-angle indications at each of a plurality of points, and means for deriving a summation of phase-angle conditions from a plurality of such instrumentalities.

12. A synchronous-synchronous transmission-line system having means for introducing corrective measures for assisting in preventing loss of synchronism during transients, characterized by means unresponsive to normal phase-angle changes and responsive only to a predetermined change in a phase-angle derived from an important synchronous machine on the system, as compared to a summation of phase-angle indications obtained at a plurality of points, for initiating said corrective measures.

13. A synchronous-synchronous transmission-line system having means for introducing corrective measures for assisting in preventing loss of synchronism during transients, characterized by means unresponsive to normal phase-angle changes and responsive only to a predetermined change in a phase-angle derived from an important synchronous machine on the system, as compared to a phase-angle derived elsewhere from the system, for initiating said corrective measures.

14. In a transmission system including a plurality of synchronous machines connected thereto, a phase-responsive apparatus comprising means for deriving an alternating current having a phase-angle corresponding to a phase angle of an important synchronous machine on the system, means for deriving a summation of alternating currents having phase angles corresponding, respectively, to phase angles at more than two points in the system, phase-responsive means for comparing the first-mentioned derived current with said summation of currents.

15. The combination, with two or more geographically spaced synchronous machines and a transmission line joining them and subject to loss of synchronizing power at times of disturbances, of means for deriving an alternating current, at each end of the line, corresponding, in phase, to voltage conditions obtaining at that end of the line, respectively, and phase-responsive means for comparing the phases of the two derived currents.

16. The combination, with two or more geographically spaced synchronous machines and a transmission line joining them and subject to loss of synchronizing power at times of disturbances, of means for deriving an alternating current, at each end of the line, corresponding, in phase, to voltage conditions obtaining at that end of the line, respectively, and phase-responsive means for initiating corrective measures for assisting in maintaining said synchronizing power in response to changes in the relative phase-angles of the two derived currents.

17. In an extended synchronous transmission system, a phase-angle-responsive instrument, and means for deriving, from said system, two diverse sources of voltage for said instrument, characterized by the fact that one of said derived-voltage sources is a summation of alternating currents having phase angles corresponding, respectively, to phase angles at more than two points in the system.

18. A multi-circuit three-phase transmission line having fault-responsive line-sectionalizing means for automatically clearing a faulty line-section, a sending-end system connected to said line, a receiving-end system connected to said line said receiving-end system being an extended system comprising generators and loads, prime movers for driving said generators, and means, electrically responsive to a fault on said transmission line, for increasing the prime-mover input to one or more of said generators during the first half-cycle of the resulting transient.

19. A multi-circuit three-phase transmission line having fault-responsive line-sectionalizing means for automatically clearing a faulty line-section, a sending-end system connected to said line, a receiving-end system connected to said line, said receiving-end system being an extended system comprising generators and loads, prime movers for driving said generators, and means, electrically responsive to the relative phase-angle between polyphase voltages at the sending and receiving ends of said transmission line, for increasing the prime-mover input to one or more of said generators.

20. The invention as defined in claim 4, characterized by the fact that said phase-angle-responsive means comprises an elongated armature and three longitudinally spaced solenoid-coils acting thereon, the two outside coils being energized from one alternating-current-source, and the central coil being energized from another alternating-current-source whose phase is to be compared to that of the first-mentioned source.

21. The invention as defined in claim 5, characterized by the fact that the phase-angle-comparing means comprises an elongated armature and three longitudinally spaced solenoid-coils acting thereon, the two outside coils being energized from the instrumentality at one end of the line, and the central coil being energized from the instrumentality at the other end.

22. A phase-angle-responsive means comprising an elongated armature and three longitudinally spaced solenoid-coils acting thereon, the two outside coils being energized from one alternating-current-source, and the central coil being energized from another alternating-current-source whose phase is to be compared to that of the first-mentioned source, characterized by the fact that one of said sources is a means driven from the shaft of a synchronous machine.

23. A phase-angle-responsive means comprising an elongated armature and three longitudinally spaced solenoid-coils acting thereon, the two outside coils being energized from one alternating-current-source, and the central coil being energized from another alternating-current-source whose phase is to be compared to that of the first-mentioned source, characterized by the fact that one of said sources includes a plurality of instrumentalities for obtaining phase-angle indications at each of a plurality of points in an alternating-current transmission system, and means for deriving a summation of phase-angle conditions from a plurality of such instrumentalities.

24. A phase-angle-responsive means comprising an elongated armature and three longitudinally spaced solenoid-coils acting thereon, the two outside coils being energized from one alternating-current-source, and the central coil being energized from another alternating-current-source whose phase is to be compared to that of the first-mentioned source, characterized by the fact that one of said sources is a means for deriving a voltage having a phase approximately corresponding to the phase of an internal voltage of a synchronous machine connected to a polyphase transmission-line system, and the other of said sources is a means for deriving a voltage having a phase approximately corresponding to a polyphase voltage appearing on the line-wires of the system.

25. A phase-angle-responsive means comprising an elongated armature and three longitudinally spaced solenoid-coils acting thereon, the two outside coils being energized from one alternating-current-source, and the central coil being energized from another alternating-current-source whose phase is to be compared to that of the first-mentioned source, characterized by the fact that one of said sources is an instrumentality at one end of an alternating-current transmission line, and the other of said sources is an instrumentality at the other end of the line.

26. An extended alternating-current power-transmission system comprising a transmission line having generators and prime movers, as well as loads, at the receiving end, and means for increasing the transient stability limit of the system, comprising power-operated means for quickly increasing the prime-mover input of a receiving-end generator, and phase-angle-controlled automatic means, unresponsive to normal phase-angle changes and electrically responsive only to a predetermined magnitude of transient disturbance, for setting said prime-mover input-increasing means in operation.

27. An extended alternating-current power-transmission system comprising a transmission line having generators and prime movers at the sending end, and means for increasing the transient stability limit of the system, comprising power-operated means for quickly modifying the prime-mover input of a sending-end generator, and phase-angle-controlled automatic means, unresponsive to normal phase-angle changes and electrically responsive only to a predetermined transient disturbance, for setting said prime-mover input-modifying means in operation.

28. An extended alternating-current power-transmission system comprising generators and prime movers, and means for increasing the transient stability limit of the system, comprising power-operated means for quickly modifying the prime-mover input of a generator connected to the system, and means, electrically responsive to the system phase angle only at times of transient disturbances, for initiating the operation of said prime-mover input-modifying means.

29. A multi-circuit three-phase transmission line having fault-responsive line-sectionalizing means for automatically clearing a faulty line-section, a sending-end system connected to said line, a receiving-end system connected to said line, said sending-end system comprising generators, said receiving-end system being an extended system comprising generators and loads, prime movers for driving said generators at both the sending and the receiving ends, and means whereby the system may be manipulated to increase its transient stability limit, comprising means for quickly varying the relation between the input and the output of a generator with respect to the rest of the system, whereby correction may be made for a transient disturbance of the normal equality of said input and said output, and a phase-angle-responsive means, whereby an indication of the need of such correction may be had.

30. The invention as specified in claim 29, characterized by the fact that said phase-angle-responsive means is responsive to the phase-angle of a voltage appearing on the system.

31. The invention as specified in claim 29, characterized by the fact that said phase-angle-responsive means is responsive to the phase-angle of a symmetrical phase-sequence quantity of the system.

32. The invention as specified in claim 29, characterized by the fact that said phase-angle-responsive means is responsive to the phase-angle of an internal voltage of a generator connected to the system.

33. An extended alternating-current power-transmission system comprising generators and prime movers, and means for increasing the transient stability limit of the system, comprising power-operated means for quickly modifying the prime-mover input of a generator connected to the system, and means, electrically responsive only to a tendency for the system-phase angle to increase beyond safe stable limits, for initiating the operation of said prime-mover input-modifying means in such direction as to counteract said tendency.

34. An extended alternating-current power-transmission system comprising generators and prime movers, and means for increasing the transient stability limit of the system, comprising power-operated means for quickly modifying the relation between the input and the output of a generator with respect to the rest of the system, whereby correction may be made for a transient disturbance of the normal equality of said input and said output, and a phase-angle-responsive means, responsive only to a tendency for the system-phase angle to increase beyond safe stable limits, for initiating the operation of said modifying means in such direction as to counteract said tendency.

35. An extended alternating-current power-transmission system comprising generators and prime movers, and means for increasing the transient stability limit of the system, comprising power-operated means for quickly modifying the prime-mover input of a generator connected to the system, and means, electrically responsive only to a predetermined severity of transient disturbance of a phase-angle of the system, for initiating the operation of said prime-mover input-modifying means in such direction as to counteract the particular transient conditions in progress.

36. A multi-circuit three-phase transmission line having fault-responsive line-sectionalizing means for automatically clearing a faulty line-section, a sending-end system connected to said line, a receiving-end system connected to said line, said sending-end system comprising generators, said receiving-end system being an extended system comprising generators and loads, prime movers for driving said generators at both the sending and the receiving ends, and means whereby the system may be manipulated to increase its transient stability limit, comprising means for quickly varying the relation between the input and the output of a generator with respect to the rest of the system, whereby correction may be made for a transient disturbance of the normal equality of said input and said output, and a phase-angle-responsive means, responsive only to a predetermined severity of transient disturbance of a phase-angle of the system, for initiating the operation of said modifying means in such direction as to counteract the particular transient conditions in progress.

ROBERT D. EVANS.